US005983623A

United States Patent [19]

Aoki et al.

[11] Patent Number: 5,983,623

[45] Date of Patent: Nov. 16, 1999

[54] SYSTEM FOR COOLING GAS TURBINE BLADES

[75] Inventors: Sunao Aoki; Eisaku Ito, both of Takasago, Japan

[73] Assignee: Mitsubishi Heavy Industries, Ltd., Tokyo, Japan

[21] Appl. No.: 09/071,482

[22] Filed: May 1, 1998

[51] Int. Cl.$^{6}$ .................................. F02C 7/12; F01D 9/06

[52] U.S. Cl. ......................... 60/39.75; 415/114; 415/115; 415/116; 415/117

[58] Field of Search ..................................... 415/114, 115, 415/116, 117, 169.1, 169.2, 121.2; 416/95, 96 R, 96 A, 97 R; 60/39.75

[56] References Cited

U.S. PATENT DOCUMENTS

| | | | |
|---|---|---|---|
| 3,066,912 | 12/1962 | Scheper, Jr. | 415/169.1 |
| 5,120,192 | 6/1992 | Ohtomo et al. | 415/115 |
| 5,558,496 | 9/1996 | Woodmansee et al. | 416/96 R |
| 5,634,766 | 6/1997 | Cunha et al. | 415/115 |
| 5,813,827 | 9/1998 | Nordlund et al. | 415/115 |

FOREIGN PATENT DOCUMENTS

| | | | |
|---|---|---|---|
| 995643 | 6/1965 | United Kingdom | 415/178 |

*Primary Examiner*—Christopher Verdier
*Attorney, Agent, or Firm*—Alston & Bird LLP

[57] ABSTRACT

A cooling passage in a turbine blade of gas turbine can be prevented from being blocked by a scale when the turbine blade is cooled by steam. A system for cooling a blade of a gas turbine having a compressor, a combustor and a turbine section comprises a cooling steam supply tube and a steam discharge tube providing communication with a cooling passage in a guide blade of the turbine section, and a cyclone separator provided in the middle of the steam supply tube in proximity to the guide blade.

2 Claims, 3 Drawing Sheets

SYSTEM FOR COOLING GAS TURBINE BLADES

FIELD OF THE INVENTION AND RELATED ART STATEMENT

The present invention relates to a structure of a gas turbine, and more particularly to a system for cooling blades in a turbine section thereof.

In general, the gas turbine has the structure in which air is compressed by a compressor. The compressed air is utilized to perform combustion by means of a combustor, and a high temperature and high pressure gas generated by the combustion is expanded in the turbine section and is converted into rotational power. In the gas turbine, an inlet temperature of the high temperature and high pressure gas in the turbine section has been raised to enhance the efficiency and various designs have been devised for cooling turbine blades. For example, a guide blade is cooled by steam. FIG. 3 is a conceptual view showing such example.

In FIG. 3, narrow passages 3 for a cooling fluid are formed inside guide blades 1 which are arranged circumferentially, and a steam supply tube 5 and a steam discharge and return tube 7 communicate with the narrow passage 3. With such a structure, a high temperature and high pressure combustion gas entering a turbine section comes into contact with the guide blades 1 so that the guide blades 1 are heated to a high temperature, but the heated guide blades 1 are suitably cooled by steam 2 having a large heat capacity as it flows through the passages 3 inside the blades so that a metal temperature of the guide blades 1 is kept at a permissible value or less.

However, there has been the following problem. When the high temperature and high pressure steam 2 flows through the steam supply tube 5, an oxide film or a scale is generated by steam oxidation on an internal face of the steam supply tube 5. The scale breaks away and enters the narrow passages 3 in the guide blade 1 together with the flow of steam so that the passages 3 may blocked. If the passages 3 are blocked so that the steam 2 is prevented from flowing, a temperature in the same portion might be excessively raised to damage the blade by heat.

OBJECT AND SUMMARY OF THE INVENTION

Accordingly, it is an object of the present invention to provide a system for cooling a blade of a gas turbine in which a blade cooling passage is not blocked by scale even if steam is used for cooling the guide blades in a turbine section.

In order to attain the above-mentioned object, the present invention provides a system for cooling a blade in a gas turbine having a compressor, a combustor and a turbine section, said system comprising a cooling steam supply tube and a steam discharge tube providing communication with a cooling passage in a guide blade of the turbine section, and a cyclone separator provided in the middle of the steam supply tube in proximity to the guide blade. The cyclone separator includes a swirl generating section for generating a swirl flow of steam, and a scale removing section provided under the swirl generating section.

According to the present invention described above, the cyclone separator is provided in proximity to the blade in the middle of the steam supply tube for cooling the blade of the turbine. Therefore, a scale or foreign substance generated by steam oxidation is centrifuged and separated so that only clean steam flows into the cooling passage in the blade. As a result, the cooling passage in the blade can suitably be prevented from being blocked. Consequently, an abnormal rise in a metal temperature can suitably be prevented from being caused by defective blade cooling operation.

DETAILED DESCRIPTION OF PREFERRED EMBODIMENTS

Figure 2:
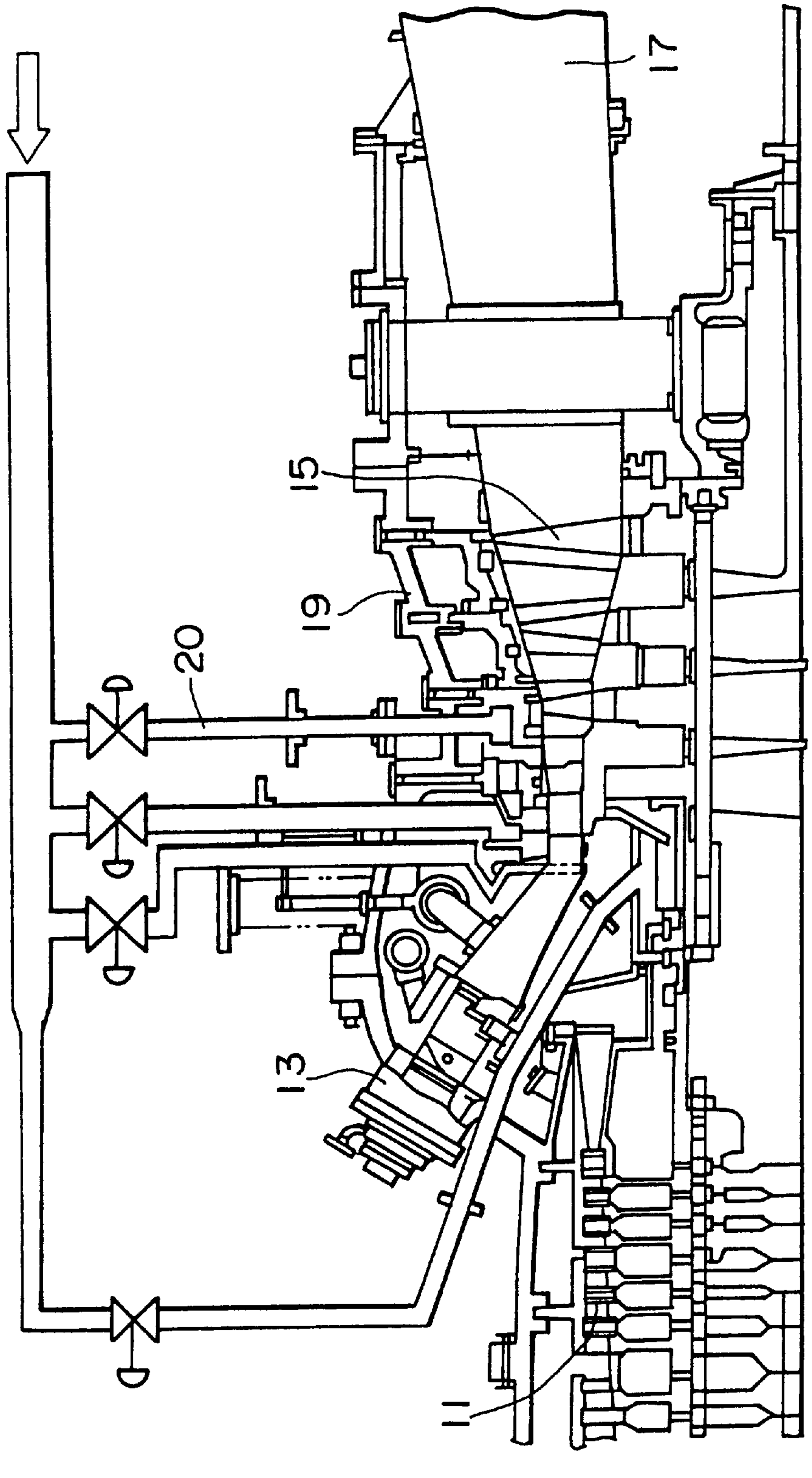
FIG. 2 is a view showing an overall structure of a gas turbine in accordance with the embodiment of the present invention.
Figure 3:
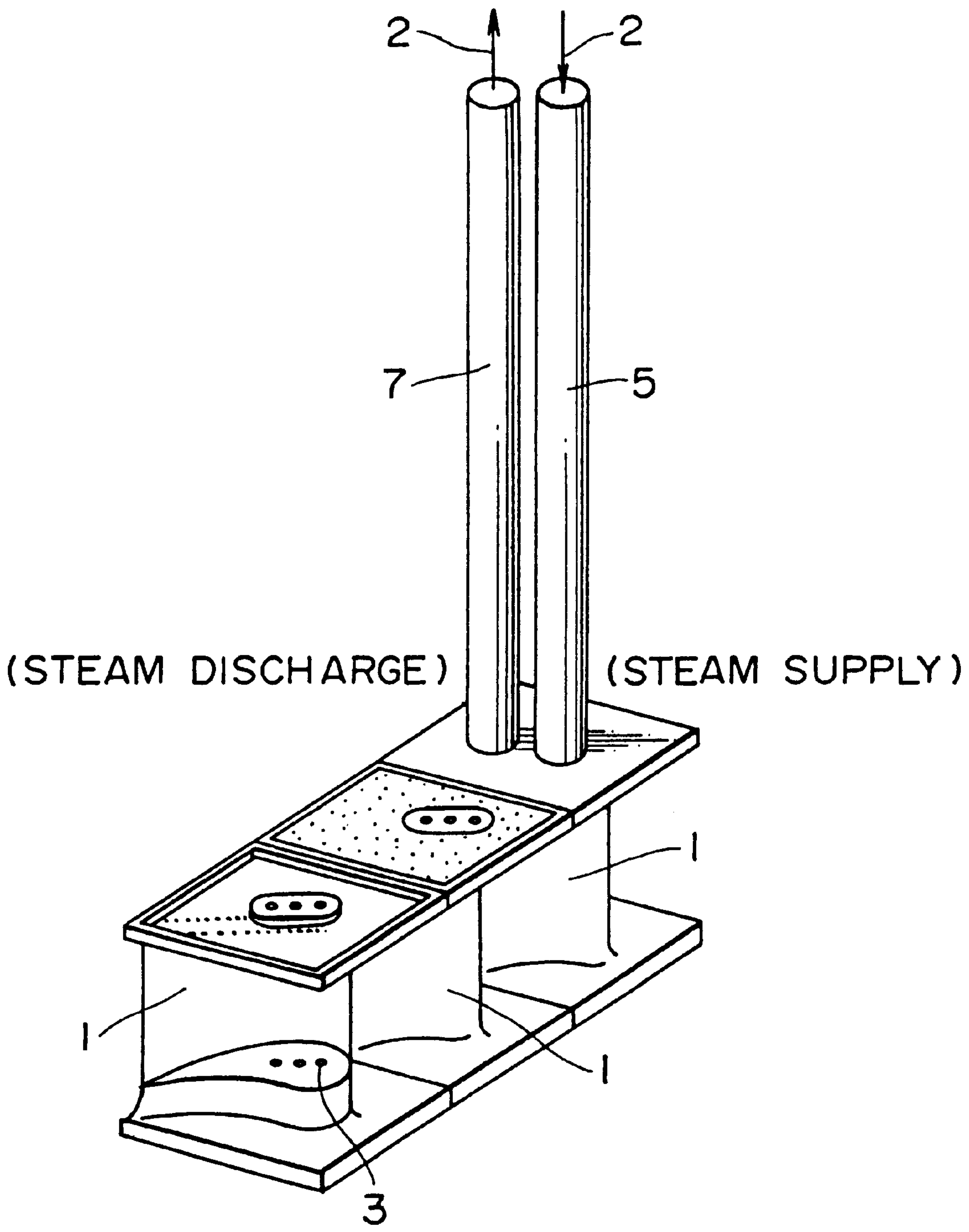
FIG. 3 (PRIOR ART)
FIG. 3 is a conceptual view showing a conventional device.

An embodiment of the present invention will be described below with reference to the accompanying drawings. FIG. 2 shows an overall structure of a gas turbine 10. In FIG. 2, the gas turbine 10 comprises a compressor 11 for compressing air, a combustor 13 for injecting fuel into the compressed air to perform combustion and for generating a high temperature and high pressure combustion gas, and a turbine section 15 alternatingly provided with arrays of stationary guide blades and those of rotary moving blades. An outlet of the turbine section 15 communicates with an exhaust tube 17. The outside of the gas turbine 10 is enclosed by a casing 19 and is provided with a cooling steam tube 20. The cooling steam tube 20 has the following structure.

Figure 1:
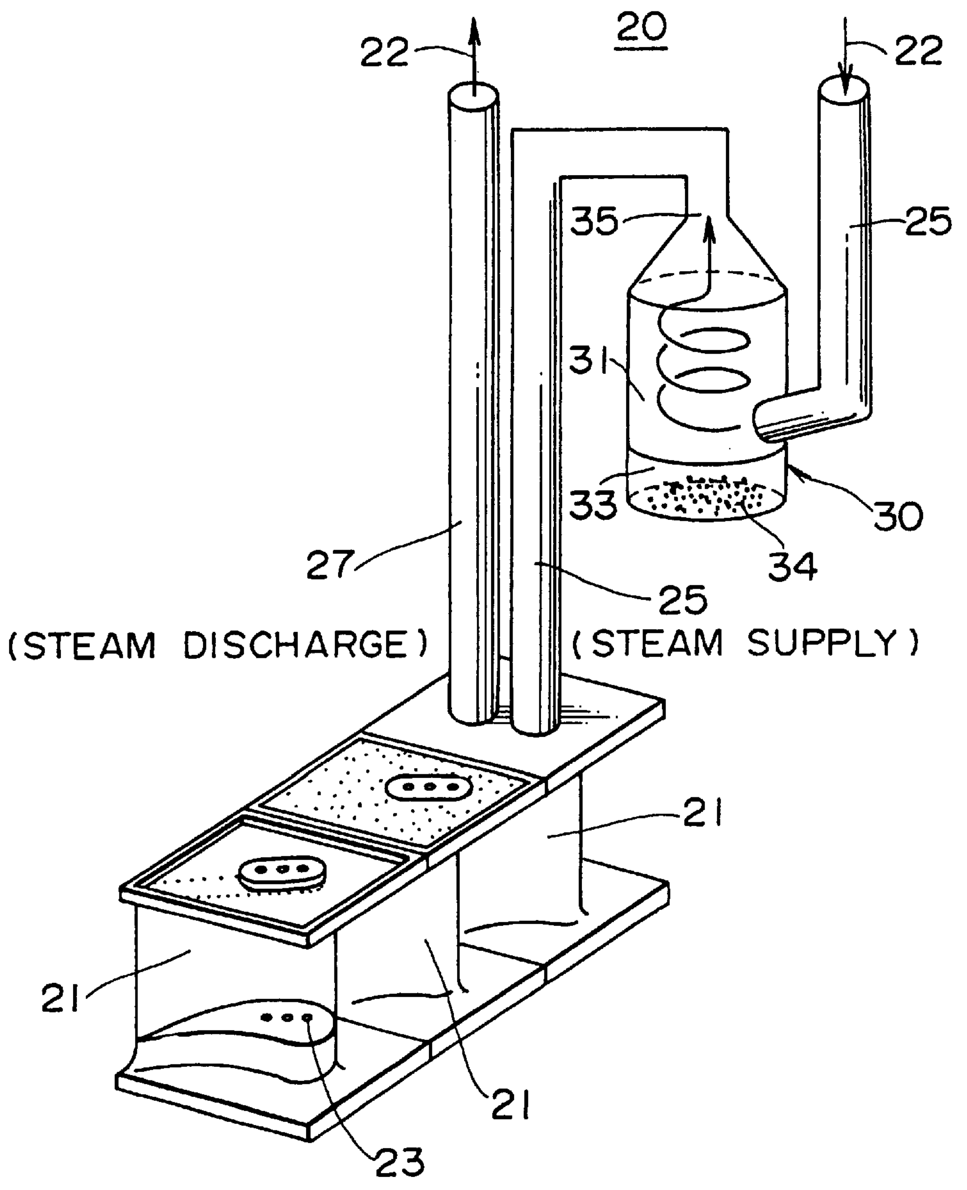
FIG. 1 is a conceptual view showing main parts in accordance with an embodiment of the present invention.

FIG. 1 is a conceptual perspective view in which main parts of the present invention are enlarged. In FIG. 1, guide blades 21 arranged to form a circular array are the same as the conventional guide blades 1. Cooling passages 23 through which steam 22 flows are formed inside the guide blades 21. The cooling passage 23 is formed by a hole having a relatively large diameter in a central portion and a number of holes having relatively small diameters which extend in proximity to a blade surface. The hole having a large diameter directly communicates with a steam supply tube 25, and the hole having a small diameter directly communicates with a steam discharge tube 27. A cyclone separator 30 is provided in the middle of the steam supply tube 25 in proximity to the guide blades 21.

The structure of the cyclone separator 30 will be described below. The cyclone separator 30 is formed by a cylindrical housing having a bottom, and includes a swirl section 31 for causing the steam to flow in a direction of a tangent line and for generating a swirl of the steam 22, and a scale separating section 33 for separating a scale 34 in which the scale collides with an internal face of the housing due to centrifugal forces caused by the swirl flow of the steam 22 and falls down. By such a structure, the scale 34 which has been generated on the internal face of the steam supply tube 25 by steam oxidation and has broken away enters the cyclone separator 30 along with the steam and falls down for separation. Then, clean steam 22 containing no foreign substance such as the scale 34 flows out of a blow-off outlet 35, and flows into a main tube of the steam supply tube 25. Thereafter, the clean steam 22 flows through the cooling passage 23 to cool the guide blades 21 from inside. Thus, the steam 22 having a raised temperature flows out toward the steam discharge tube 27, and returns to a steam source for recirculation and the like.

We claim:

1. A system for cooling a blade in a gas turbine having a compressor, a combustor and a turbine section, said system comprising:

a cooling steam supply tube and a steam discharge tube which are adapted to be connected with a guide blade of the turbine section for communicating with a cooling passage in the guide blade; and a cyclone separator provided in said steam supply tube.

2. The system for cooling a blade of a gas turbine according to claim 1, wherein said cyclone separator is formed by a cylindrical housing having a bottom, and includes a swirl section for generating a swirl of the steam, and a separating section for separating foreign matter collides with an internal face of said housing due to centrifugal forces applied by said swirl flow of said steam and falls down.

* * * * *

UNITED STATES PATENT AND TRADEMARK OFFICE

CERTIFICATE OF CORRECTION

PATENT NO. : 5,983,623

DATED : November 16, 1999

INVENTOR(S) : Aoki et al.

It is certified that error appears in the above-identified patent and that said Letters Patent is hereby corrected as shown below:

In the Abstract, line 1, before "gas" insert --a--; line 2, before "scale" cancel "a".

Column 4, line 5, after "matter" insert --in which the foreign matter--.

Signed and Sealed this

Fourth Day of July, 2000

*Attest:*

Q. TODD DICKINSON

*Attesting Officer*

*Director of Patents and Trademarks*